US007600255B1

(12) United States Patent
Baugher

(10) Patent No.: US 7,600,255 B1
(45) Date of Patent: Oct. 6, 2009

(54) PREVENTING NETWORK DENIAL OF SERVICE ATTACKS USING AN ACCUMULATED PROOF-OF-WORK APPROACH

(75) Inventor: Mark Baugher, Portland, OR (US)

(73) Assignee: Cisco Technology, Inc., San Jose, CA (US)

( * ) Notice: Subject to any disclaimer, the term of this patent is extended or adjusted under 35 U.S.C. 154(b) by 847 days.

(21) Appl. No.: 10/824,729

(22) Filed: Apr. 14, 2004

(51) Int. Cl.
| G06F 7/04 | (2006.01) |
| G06F 17/30 | (2006.01) |
| G06F 7/58 | (2006.01) |
| G06F 15/16 | (2006.01) |
| G06F 12/00 | (2006.01) |
| G06F 12/14 | (2006.01) |
| G06F 13/00 | (2006.01) |
| G06F 11/00 | (2006.01) |
| G06F 12/16 | (2006.01) |
| G06F 15/18 | (2006.01) |
| G06F 15/173 | (2006.01) |
| G06F 15/177 | (2006.01) |
| G06K 9/00 | (2006.01) |
| G06K 19/00 | (2006.01) |
| H04L 9/32 | (2006.01) |
| H04L 9/00 | (2006.01) |
| H04L 1/00 | (2006.01) |
| H04L 12/26 | (2006.01) |
| G11C 7/00 | (2006.01) |
| G08B 23/00 | (2006.01) |
| H03M 1/68 | (2006.01) |
| H04K 1/00 | (2006.01) |
| H04K 3/00 | (2006.01) |
| H04N 7/16 | (2006.01) |
| B41K 3/38 | (2006.01) |
| G01R 31/08 | (2006.01) |
| G08C 15/00 | (2006.01) |
| H04J 1/16 | (2006.01) |
| H04J 3/14 | (2006.01) |

(52) U.S. Cl. .................. 726/22; 726/2; 726/3; 726/4; 726/16; 726/17; 726/21; 726/23; 726/26; 726/27; 726/30; 713/168; 713/179; 380/1; 380/59; 709/223; 709/224; 715/734; 715/736; 370/242; 370/245

(58) Field of Classification Search .................. 726/22, 726/2, 3, 4, 16, 17, 21, 23, 26, 27, 30; 713/168, 713/179; 380/1, 59
See application file for complete search history.

(56) References Cited

U.S. PATENT DOCUMENTS 6,321,339 B1 * 11/2001 French et al. .................. 726/2
(Continued)

OTHER PUBLICATIONS

L. Lamport, "Password Authentication with Insecure Communication," Communications of the ACM, vol. 24, No. 11, Nov. 1981, 3 pages.

(Continued)

*Primary Examiner*—Nasser G Moazzami
*Assistant Examiner*—Oscar A. Louie
(74) *Attorney, Agent, or Firm*—Hickman Palermo Truong & Becker LLP

(57) ABSTRACT

Accumulated proof-of-work approaches for protecting network resources against denial-of-service attacks are disclosed. A client computer or other requester is required to perform work, such as repeatedly hashing a message until a specified number of bits is zero, as a condition for accessing a resource. Proof of the work performed by a legitimate requester is accumulated across multiple requests, so that established users of a resource are not penalized when proof-of-work is used to prevent a denial of service attack. Requesters who cannot show accumulated work greater than a specified threshold are required to perform additional work. In certain embodiments, work may be accumulated only within a specified time window, and the threshold may vary according to resource capacity or loading. Proof-of-work values may be communicated between the user and the resource in cookies.

28 Claims, 5 Drawing Sheets

U.S. PATENT DOCUMENTS 6,944,663 B2 * 9/2005 Schuba et al. ............... 709/225
7,197,639 B1 * 3/2007 Juels et al. .................. 713/168

OTHER PUBLICATIONS

C. Dwork et al., "On Memory-bound Functions for Fighting Spam," Crypto 2003, 17 pages.

A. Back, "Hashcash: A Denial of Service Counter Measure," Aug. 1, 2002, 10 pages.

C. Dwork et al., "Pricing via Processing or Combating Junk Mail," in Advances in Cryptology (E. Brickell, ed.), in CRYPTO'92, Lecture Notes in Computer Science, LNCS 740, pp. 139-147 (SpringerVerlag, Aug. 1992).

* cited by examiner

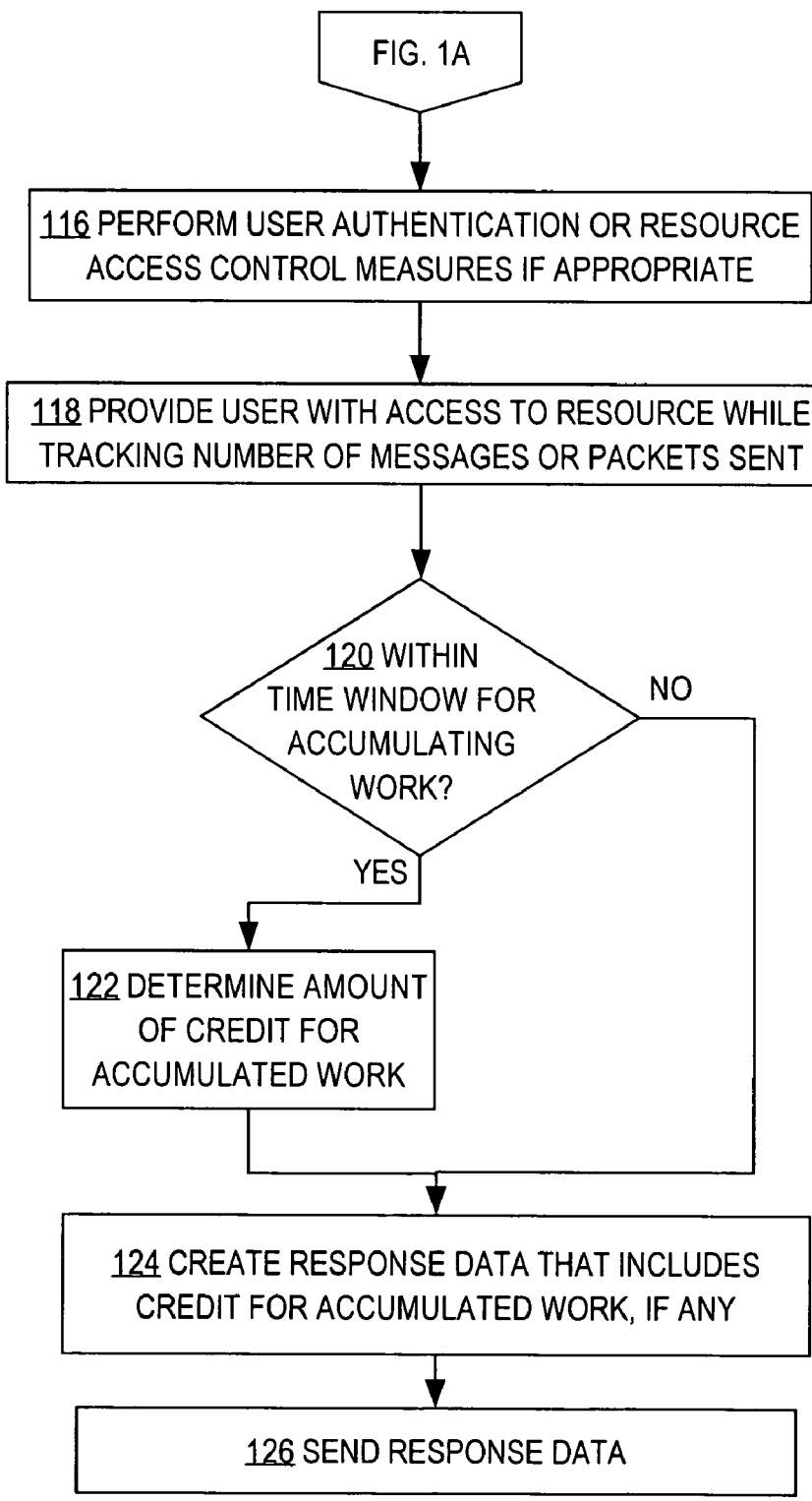

200 PROOF-OF-WORK DATA BLOCK AS SENT FROM REQUESTER TO RESOURCE

201 PROOF-OF-WORK DATA BLOCK AS SENT FROM RESOURCE TO REQUESTER

PREVENTING NETWORK DENIAL OF SERVICE ATTACKS USING AN ACCUMULATED PROOF-OF-WORK APPROACH

FIELD OF THE INVENTION

The present invention generally relates to computer networks. The invention relates more specifically to preventing denial of service attacks in networks.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Networks have become an important tool for businesses and consumers alike, many of which are now dependent on the constant availability of network resources such as mail servers, Web sites, and content servers. As use of networks increases, protecting networks from disruption by malicious entities becomes more important. For example, denial of service ("DoS") attacks may deprive legitimate users of access to network services, and have been used successfully to disrupt legitimate user access to internet sites such as Yahoo! and CNN.

"Proof-of-work" (POW) is a technique that can help defend against a spam or denial-of-service (DoS) attack in which one or more attackers marshal M machines (e.g., processing "zombies" or "bots") to overload a resource with requests. Assume that a resource is trying to service a community of N legitimate users in addition to M attacking bots. The resource requires each machine to perform some level of "work," such as repeatedly hashing a message until certain bits within the hash output are zero. Such techniques are described further in the references [Dwork93], [Back], [Dwork03]. If the hash function approximates a random output, then the likelihood of generating a result with k particular bits set to zero is $2^{\wedge}(-k)$, and the hash function will be repeated $2^{\wedge}k$ times on average. POW can be performed using computational work, memory-access work, or a similar commitment of practically any computer resource such as memory.

The POW defense against a DoS attack may be effective when N users have a great deal of extra capacity, and the attacking bots have dedicated all their capacities to the attack. Under these conditions, an increase in the work, w, needed to access the resource can translate into an increase in the number of bots needed to carry out an attack. For example, an increase in work of 10 w might increase the resources needed to send a mail message by 10×.

However, the POW defense has certain drawbacks. First, the legitimate user is penalized by having to perform the same amount of work as the bot, and second, the defense ultimately fails if the attacker has enough bots to out-compute the users.

As a result, there is a need for a way to prevent denial-of-service attacks on a network resource without imposing unfair penalties upon legitimate users who regularly use the resource in a proper manner.

In certain past approaches a resource seeks to authenticate a user before providing the user with access to the resource. In some such approaches, the resource requires creating a "security association" to be established between the resource and the user. In certain approaches, the user is required to exchange a cryptographic key or maintain an SSH session, TLS session or other security association with the resource. Hash-based authentication schemes as described in [Lamport81] provide keyless techniques for authenticating users on a network. In another approach, user identification uses public-key cryptography (PKC), in which the user maintains a private key and provides the public-key portion to resources. The PKC approach, however, requires the user to maintain and exchange a cryptographic key, which many users do not do or never will do. Creating, maintaining and exchanging keys are not easy tasks for typical internet users. Moreover, PKC is not needed for conventional POW approaches.

In the description herein, the following abbreviations identify certain technical references: [Lamport81] refers to L. Lamport, "Password Authentication with Insecure Communication," Communications of the ACM, Vol. 24, Number 11, November 1981, [Dwork92] refers to C. Dwork et al., "Pricing via Processing or Combating Junk Mail," in Advances in Cryptology (E. Brickell, ed.), CRYPTO'92, Lecture Notes in Computer Science, LNCS 740, pp. 139-147 (Springer-Verlag, August 1992); [Back97] refers to A. Back, "Hashcash: A Denial of Service Counter Measure," Aug. 1, 2002 (self-published); and [Dwork03] refers to C. Dwork et al., "On Memory-bound Functions for Fighting Spam," Crypto 2003.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1B is a flow diagram that illustrates further steps in the approach of FIG. 1A;

DETAILED DESCRIPTION

Figure 1A:
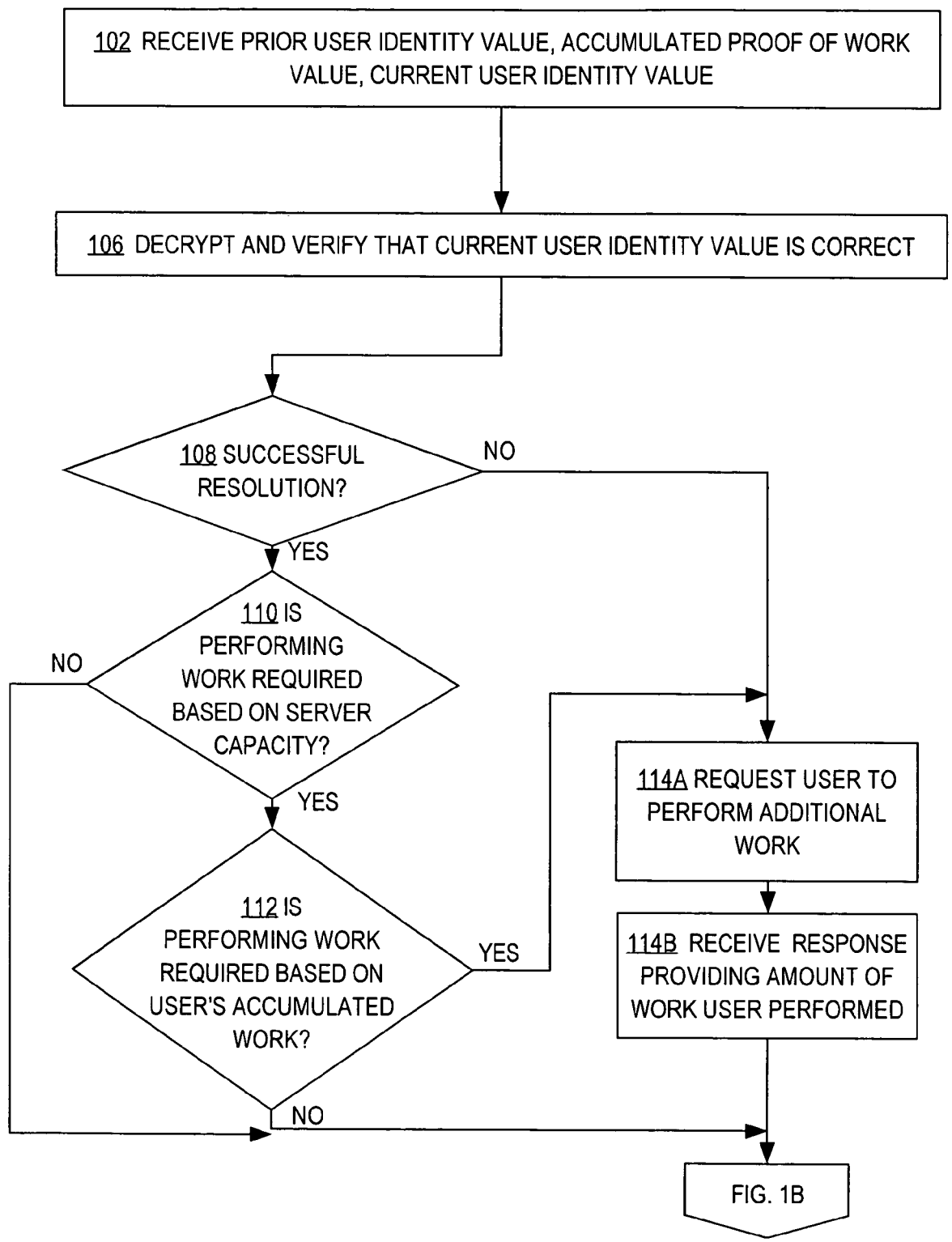
FIG. 1A is a flow diagram that illustrates one approach for preventing denial of service attacks in networks using an accumulated proof-of-work approach.

A method and apparatus for preventing denial of service attacks in networks using an accumulated proof-of-work approach is described. In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

Embodiments are described herein according to the following outline:

1.0 General Overview
2.0 Approaches for Preventing Denial of Service Attacks in Networks Using Accumulated Proof-of-Work Approaches
    2.1 Overview of Approaches
    2.2 Implementation Example—Functional Description
    2.3 Implementation Example—Algorithmic Description
    2.4 Other Characteristics of Certain Embodiments 3.0 Implementation Mechanisms-Hardware Overview
4.0 Extensions and Alternatives

1.0 GENERAL OVERVIEW

As an introduction only, and without limiting the scope of the appended claims, the needs identified in the foregoing Background, and other needs and objects that will become apparent for the following description, are achieved in the present invention, which comprises, in one aspect, a method for preventing an attack on a network, comprising the steps of receiving a request to access a resource from a uniquely identifiable user, wherein the request includes an accumulated work value; determining whether the accumulated work value exceeds a required work threshold value, and if not, requiring the user to perform a quantity of work as a condition for accessing the resource; providing the user with access to the resource; determining an amount of accumulated work output value to provide to the user based on a volume of data communicated between the resource and the user; and providing the accumulated work output value to the user.

A user of a resource presents credentials that enable the resource to uniquely identify the user, such as a hash chain or information prepared using a cryptographic key. Verification of the credentials enables the resource to verify that an accumulated work value is properly associated with a returning user.

In one approach, a client computer or other requester is required to perform work, such as repeatedly hashing a message until a specified number of bits is zero, as a condition for accessing a resource. Proof of the work performed by a legitimate requester is accumulated across multiple requests, so that established users of a resource are not penalized when proof-of-work is used to prevent a denial of service attack. Requesters who cannot show accumulated work greater than a specified threshold are required to perform additional work. In certain embodiments, work may be accumulated only within a specified time window, and the threshold may vary according to resource capacity or loading. Proof-of-work values may be communicated between the user and the resource in cookies.

In other aspects, the invention encompasses a computer apparatus and a computer-readable medium configured to carry out the foregoing steps. Further, many other features and aspects will become apparent from the following description and from the appended claims.

2.0 APPROACHES FOR PREVENTING DENIAL OF SERVICE ATTACKS IN NETWORKS USING ACCUMULATED PROOF-OF-WORK APPROACHES

2.1 Overview of Approaches

The accumulated proof-of-work ("POW") approach described herein is based upon a determination that a legitimate user who has repeatedly and appropriately accessed a resource over a long period of time should accumulate POW over time and receive credit for the previous work. In one respect, the accumulated POW approach herein establishes an "anti-DOS association" between a resource and a user. The user is not required to exchange a cryptographic key or maintain an SSH, TLS or any other conventional security association with the resource. The accumulated POW approach requires less work to be performed by users that have a history of using the resource than by a user or attacker that has little or no history of using the resource.

In order to credit users for past work, a resource identifies returning users and credits the returning uses with the POW that they have performed before. Each requester must perform some form of original work at least once. In one embodiment, performing and/or storing thousands, tens of thousands, or even more hash operations is the original required work, and must be performed by a requester at least once in order to accumulate POW. Subsequent POW is performed on each request or message, which a requester hashes repeatedly according to a workload factor, k. In one embodiment, as in the approaches of Dwork-Naor Fiat-Shamir and Hashcash, k is the number of particular bits that are zero in the output of h.

2.2 Example Implementation

Functional Description

Figure 2A:
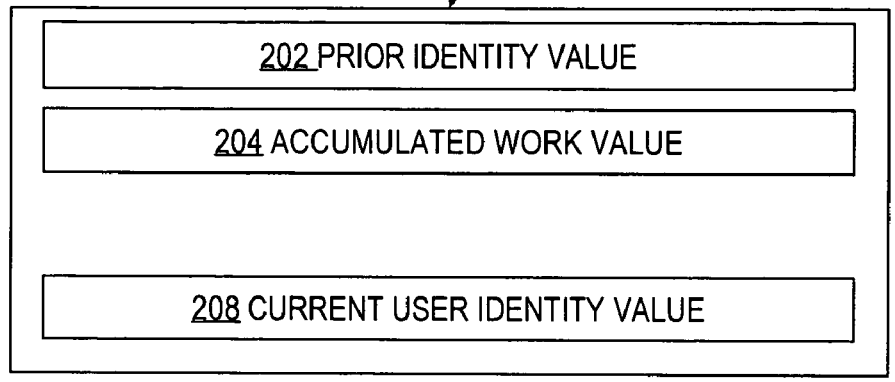
FIG. 2A is a block diagram of a data block that may carry accumulated proof-of-work information from a requester to a resource.
Figure 2B:
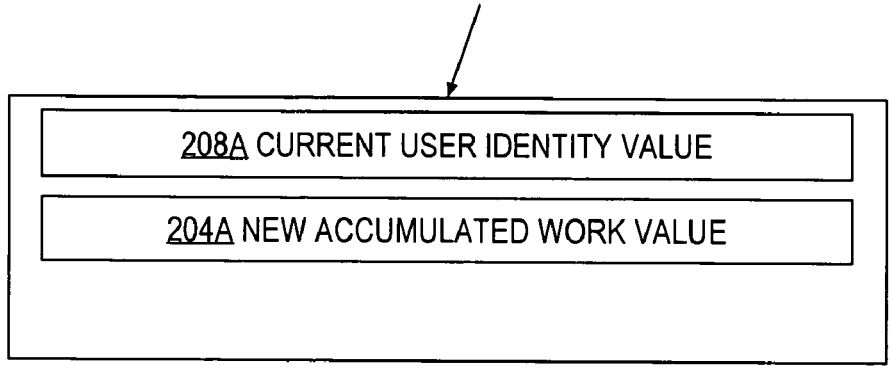
FIG. 2B is a block diagram of a data block that may carry accumulated proof-of-work information from a resource to a requester.

An example implementation of an accumulated proof-of-work approach for preventing network denial-of-service attacks is now described with reference to FIG. 1A, FIG. 1B, FIG. 2A, FIG. 2B. FIG. 1A is a flow diagram that illustrates one approach for preventing denial of service attacks in networks using an accumulated proof-of-work approach; FIG. 1B is a flow diagram that illustrates further steps in the approach of FIG. 1A; FIG. 2A is a block diagram of a data block that may carry accumulated proof-of-work information from a requester to a resource; FIG. 2B is a block diagram of a data block that may carry accumulated proof-of-work information from a resource to a requester.

Referring first to FIG. 1A, in step 102, a prior user identity value, an accumulated proof-of-work value, and a current user identity value are received. In one embodiment, the values identified in step 102 are received in a cookie or other data block. The cookie or data block may form part of a packet, segment or message organized according to any Layer 2 through Layer 6 protocol. For example, the values may be carried in an HTTP cookie. Alternatively, encapsulation techniques may be used to package the proof-of-work data block 200 within a packet, segment or message of a particular protocol. Encrypted or signed cookies may be used, but encryption or digital signing is not required for substantial security.

In one embodiment, the values of step 102 are in a data structure having the elements of FIG. 2A. In this embodiment, a proof-of-work data block 200 comprises a prior identity value 202, accumulated work value 204, and current user identity value 208. Data block 200 may comprise a cookie in which prior identity value 202 is a 30-byte binary value that is base-64 encoded into a 40-byte field of the cookie, accumulated work value 204 is an 8-byte hexadecimal field, and current user identity value 208 is a 40-byte field. Thus, data block 200 may comprise an 88-byte cookie.

As optimizations to reduce the size of the cookie, binary values may be used, or the prior identity value 202 may be truncated.

Further, in one embodiment, prior identity value 202 and accumulated work value 204 are encrypted using a secret key that is known only to a resource that a user wishes to access. For example, the prior identity value 202 and accumulated work value 204 may be encrypted using a 16-byte AES key so that the resulting ciphertext is a 48-byte combined value. In an alternative embodiment, prior identity value 202 and accumulated work value 204 are digitally signed using a public key signature, and the resulting digital signature is carried as an additional value in data block 200. The use of the foregoing values in certain embodiments is described further below.

In step 106, the current user identity value is decrypted and verified. Step 106 is performed to verify that a user presenting an accumulated proof-of-work value actually performed the prior work. For example, assume that a cookie received at step 102 comprises prior identity value 202, accumulated work value 204, and current user identity value 208, which are respectively denoted mathematically as $$\{H(i+1,x) \| R(u)\} key$$

$$H(i,x)$$

Assume that the encryption key, k, is a 16-byte AES key. After decrypting the value, the resource implementing the process of FIG. 1A, FIG. 1B checks that $H(i+1, x)=h(H(i, x))$. If this is true, then the resource had previously encrypted $H(i+1, x)$, and the user presenting that value is in possession of the secret x and has generated $H(i+1, x)$ from $H(i, x)$, because the user provides the value $H(i, x)$, a 30-byte quantity (40 bytes under base-64 encoding), to the resource to prove the foregoing relationship in the cookie.

If the user identity value is successfully verified, as tested in step 108, then in step 110 the process determines whether the user should be required to perform work as a result of server or resource capacity issues. Thus, before considering whether the user is entitled to be credited with accumulated work (denoted by R(u)) as a result of past transactions, the process determines if work is required of a user at all because the requested resource is highly loaded or operating near capacity. If the resource is not highly loaded or at capacity, then there may be no need to require any user to perform work and there may be no need to consider credit for accumulated work. Server load factor data, resource capacity data, or other values obtained from the resource, or from another system, may be used to determine the result of step 110.

If the test of step 110 is true, then in step 112, the process determines whether the user is required to perform work based on the user's accumulated work. The result of step 112 may be determined, for example, by checking whether the accumulated proof-of-work value provided at step 102 is greater than an accumulated work threshold. If the accumulated proof-of-work value is not greater than the threshold, then control passes to step 114A, in which the user is requested to perform the required amount of work.

At step 114B, the user determines for itself how much work it wishes to perform and receive credit for as a condition for accessing a resource, performs the specified amount of work, and provides a response message to the resource that proves that the user has performed the specified work. This work may be performed automatically in each message sent by the requester to the resource. Various policies may be used to determine whether the amount of work performed by the user is sufficient to receive access to the resource, as described further below.

After step 114B, or after step 110 if no work is required based on the resource capacity determination, then in step 116 additional resource access control measures are performed, if appropriate for the requested resource. Thus, step 116 may involve using a role-based access control system to determine whether the user should be granted access to the resource. Step 116 is optional, and may be omitted in certain embodiments. Step 116 is shown simply to illustrate that a particular resource may implement additional access controls or authorization checks if desired.

In step 118, the user is provided with access to the resource, while tracking the additional work (e.g. hashing) performed by the user in the messages or packets communicated between the user and the resource. The resulting work performed in the messages or packets may be stored in the accumulated work counter 314 of FIG. 3.

In step 120, a test is performed to determine whether the user is within a time window in which accumulating work is permitted. Step 120 may be used to prevent a particular user from accumulating an excessively large work credit over a short period of time, or to prevent replay of values presented in user requests at step 102. If the current time is within the allowed window, then in step 122, the process determines a credit for the accumulated work that has been performed by the user. In one embodiment, a timestamp is communicated in the cookie and encrypted with the prior identity value to correctly place the request within the time window. An alternative embodiment keeps a table of all requests, indexed by the prior identity value, to identify a user that returns a request within the time window and is thereby denied the privilege of accumulating work.

In step 124, response data is created that includes a value representing credit to the user for accumulated work. In one embodiment, the response data is structured as shown in FIG. 2B, in which a proof-of-work data block 201 comprises a current user identity value 208A and a new accumulated work value 204A. The new accumulated work value 204A reflects the work credit that was determined at step 122. In step 126, the response data is sent. The response data of step 124, 126 may be a cookie, such as an HTTP cookie, that is returned to the user in an HTTP POST response from the resource.

Thereafter, when the user returns to the same resource, the values presented at step 102 may include an accumulated proof-of-work value that is updated based on the credit that the user received at step 122-126. As a result, subsequent processing of step 112 may permit the user to access the resource without performing additional work at steps 114A-114B. However, users who are accessing the resource for the first time, or who have accumulated work that does not exceed the specified threshold, may be required to perform additional work at steps 114A-114B under the same resource load conditions experienced by the returning user who does have accumulated work above the threshold. Therefore, returning authenticated users who interact with a resource are credited for accumulated work and do not have to perform the work required of other users for the purpose of preventing of denial-of-service attacks. The returning authenticated users accrue a tangible benefit and access the resource more rapidly, but the resource remains fully protected against denial-of-service attacks by bots or others.

2.3 Example Implementation

Algorithmic Description

In one embodiment, a keyless approach is used for identification of a returning user at step 106. The keyless method is based on the one-time password method of Lamport, which requires the pre-computation of a hash chain from a non-shared user secret (x) by the relation $H(n,x)=h(H(n-1,x))$, where n>0 and $H(0,x)=x$. The user secret x is a random value that is created by the resource and is relatively large; for example, a value of 20 bytes is considered sufficient.

The function h is a one-way function that is hard to invert. In one embodiment, h is implemented as the SHA-1 algorithm. This algorithm is considered a good choice because of its fundamental security properties, such as providing a uniformly distributed output that is indistinguishable from random output, and widespread use. However, other one-way hash functions may be used.

The number n is selected to be at least as large as the number of packets the user is expected to send to the resource over a prolonged period of time. Since the user is a requester, the number of packets sent to the resource typically will be small relative to the number of packets sent by the resource. Therefore, a value of n on the order of 10^6 is expected to be sufficient for most applications for a long period of time.

A returning user presents two data items to the resource in the proof-of-work data block 200. The first item may comprise prior identity value 202 which may have the value $\{H(i+1,x), R(u)\}key$, which is the hash value $H(i+1,x)$ from the previous request, and the accumulated work value 204 denoted $R(u)$ for user u; both values are encrypted with a secret key denoted by "key." Optionally, the values may be signed with a digital signature using a private key that would be denoted as "sig."

The second item is the current user identity value 208 denoted $H(i,x)$, which has the property $h(H(i,x))=H(i+1,x)$. The function h is a one-way function that is hard to invert, such as SHA-1. By the second item the user effectively associates an $H(j,x)$ value with a particular request that includes proof-of-work data block 200 by generating the $H(j,x)$ value based on the request. The request that includes the proof-of-work data block 200 may comprise one or more messages or packets, depending on the application. Thus the current user identity value 208 can be a SHA-1 output tag based on the request, or some portion of such a tag. The current user identity value 208 is attributed to a particular user in possession of secret x, at step 106, if the current user identity value 208 yields the prior user identity value 202 denoted $H(j+1,x)$ when hash function h is applied to it. Thus, the current user identity value 208 is deemed valid if and only if $h(H(j,x))=H(j+1,x)$, from the user's previous request (i.e., $H(j+1,x)$ from $\{H(j+1,x), R(u)\}key$).

Optionally, each request message is hashed according to a POW parameter, k, and this second hash output is included in the message as a message integrity value. In one embodiment, a proof-of-work data block 200 further includes a work output value denoted g, with g>0 such that $h(g\|H(j,x))$ has the k zero bits (wherein $\|$ denotes concatenation). The value g may be prepared according to the approaches of [Dwork93, Back].

In the preferred embodiment, the resource attributes a quantity of work to the user at the end of a resource access session, at step 122, by the relation $$R(u)=2^k*p$$

where k is the number of bits in the POW parameter, and p is the number of messages or packets sent by user u during the request. This yields a fractional accumulation in total work performed by the user. At the end of the session, the resource encrypts and returns the values $R(u)$ and $H(i,x)$ to the user in the response of step 124, 126. Optionally, the resource digitally signs $R(u)$ and $H(i,x)$. The digital signature applied as part of step 124 is private to the resource. In one embodiment, DSA is used.

At the next request, the user provides the value $\{R(u) H(i,x)\}key$ to the resource in a subsequent request and proof-of-work data block 200 that also carries the next identification value, $H(i-1,x)$. The resource verifies its signatures and that $H(i,x)$ equals $h(H(i-1,x))$.

The resource may restrict the frequency of work accumulation to be once per time period, such as once per hour or per day, at step 120. For example, step 120 may involve checking a list of users who have contacted the resource in a particular time window, e.g., a stored list of $H(j,x)$ values, to determine if a returning user's $H(j,x)$ value is on the list, and refusing to allow POW to be accumulated if it is. Such a window is the preferred embodiment for controlling the frequency of POW accumulation, and also for preventing replay of old messages. An alternative embodiment may use a timestamp that is signed and passed to the user with the H and $R(u)$ values. The particular mechanism for checking frequency of work accumulation and replay is not critical, but these two conditions normally should be checked in an embodiment, in addition to $H(i,x)=h(H(i-1,x))$.

If a timestamp is used, then the timestamp can be an NTP timestamp that is encrypted by the resource along with the hash output provided by the requester and the work output that the resource computes based on the work done by the requester in making the request. For example, a cookie sent from the resource to the requester with a timestamp may comprise $\{H(i+1, x)\|R(u)\|timestamp\}key$. A cookie sent from the requester to the resource may comprise $\{H(i+1, x)\|R(u)\|timestamp\}key$ and $H(i,x)$ When the POW conditions hold, the resource applies the $R(u)$ "credit" to the returning user as part of the test at step 112. At the end of transacting a prior request, user u will have accumulated $R'(u)=R(u)+2^k*p$, which is encrypted or signed along with $H(i-1,x)$ and returned at step 124. These values are passed in the subsequent request 200 along with $H(i-2,x)$ to continue the authentication chain and work accumulation.

Referring again to step 110 and steps 114A-114B, during a request in which all users' requests are within the particular resource's capacity threshold, C, the resource may request minimal POW from its users, perhaps very few bits. Under congestion conditions, possibly caused by a DoS attack, the POW determined at step 114A is selectively increased according to an accumulated work threshold A*, and only requesters who have not accumulated work to that A* have their POW parameters increased. Every user u having accumulated work $A(u)>A*$ does not perform additional POW. The accumulated work parameter $A(u)$ for a user u is computed as follows.

$$A(u)=trunc(\log 2(R(u)))$$

The trunc function produces the largest integer that is less than or equal to the base 2 logarithm operation. Thus, $A(u)$ is the number of bits of work performed by u over time; $A(u)$ is the accumulated POW of user u. If and when all requesters have the same accumulated POW, the work parameter is increased at step 114A for all requesters. Until that time, the resource resolves the test of step 112 based on $A(u)$ values.

Accordingly, the POW parameter, k, demanded for an individual request is unique to the requester; it is $k\_r$ for requester r. For users with $A(r)>A*$, $k\_r$ is zero or very small. For users with $A(r)<=A*$, $k\_r>0$, or $k\_r$ is not very small.

A variety of policies may be followed for setting $k\_r$ at step 114A. In one embodiment, requesters are partitioned between those that need to increase their $A(u)$ and those that do not need to increase their accumulated work. The partition point may be based on the resource capacity C and a capacity threshold, T<C. While resource utilization is between T and C, requesters below the partition compete for resources by performing work until their POW is at or above the A(*) partition. Various policies may be used depending on the size of C-T, on the number of requesters that are above and below the partition, the dispersion of the A(*) values, or on the variation in the incremental utilization needed to service requests.

To determine $k\_r$, an implementation may assume that every user request increases resource utilization by the same amount. In this scenario, the resource may select values of $k\_r$ such that the maximum number of requesters who complete the work on the next request will increase resource utilization to T'<T+(C−T)/2, thus halving the threshold. Following this, T is set to T' and the process is repeated. Alternatively, an implementation may assume that resource utilization varies by request. In this alternative, the resource could set the k_r values assuming the maximum utilization for each request and follow the process described above for uniform resource utilization.

The work that the user is required to perform at step 114B may comprise computational work, such as hashing the original message until n bits of the output are zero. In such an embodiment, an encoded request to perform the required work at step 114A is sent back in the cookie to the requester, or a request to perform the required work is conveyed in a separate request of another protocol. In one embodiment, when the work is complete and the requester is reporting the completed work to the resource, the user or requester sends a cookie that includes a hash of the message. For example, a cookie sent from the requester to the resource at step 114B may comprise:

{H(i+1, x)||R(u)||timestamp}key
H(i,x)
k
2

Such a cookie reports that the requester has hashed a message with a number k that ensures that the first 2 bits of the output of the hash are zero. In this case, the requester will need to run the hash an average of 4 times, and will be credited 2 bits of work. Each time the requester runs the hash function, the requester concatenates a random number to the message (n1||message) and checks to see if the first 2 bits of the output are zero. If not, the requester tries again with a new random number, i.e., H(n2||message) and checks to see if the first 2 bits are zero. Assume, for example, that the random number is nj. If the first two bits are zero, then the requester sets k=nj and returns k in a cookie of the form given above. While the requester will need to repeat this process 4 times, on average, to validate the result, the resource only needs to do perform one check. Thus, the operation h(k||message) yields an output with the first two bits that are zero, where h is SHA-1 in the preferred embodiment.

The preceding example uses 2 bits, but the number could be any amount of work that the requester chooses to perform and to receive credit for performing.

Figure 3:
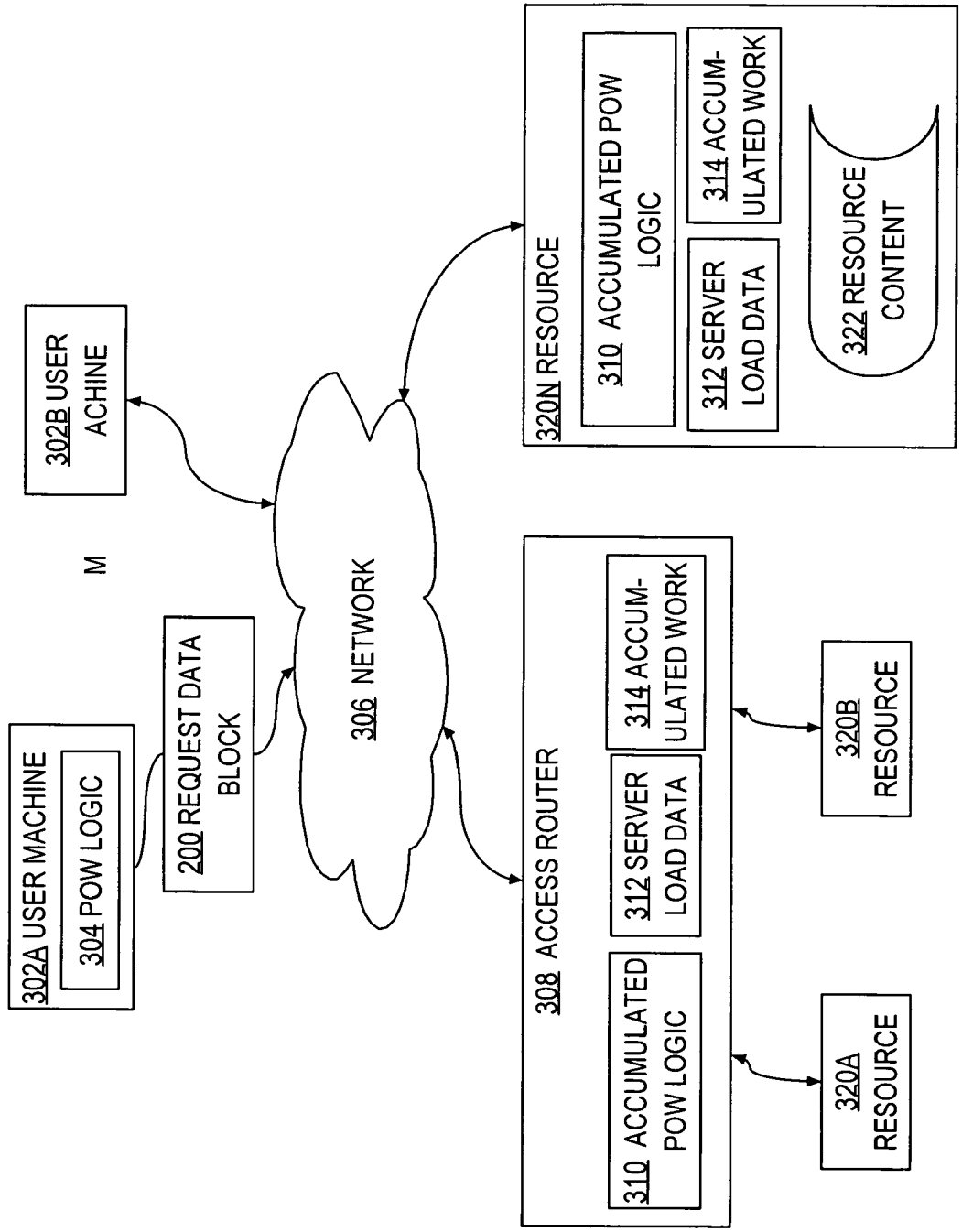
FIG. 3 is a block diagram of a network system in which the approach of FIG. 1A, FIG. 1B, FIG. 2 may be implemented.

The steps of FIG. 1A, FIG. 1B may be implemented in one or more computer programs or other software elements executed in one or more processes, or in firmware, hardware, or a combination thereof. FIG. 3 is a block diagram of a network system in which the approach of FIG. 1A, FIG. 1B, FIG. 2 may be implemented. One or more user machines 302A, 302B are communicatively coupled to a network 306. Each of the user machines 302A, 302B includes POW logic 304. User machines 302A, 302B use POW logic 304 for performing work at the user machine as a condition of access to a network resource.

Network 306 may comprise any local area network, wide area network, internetwork, or a combination thereof. In a practical embodiment, there may be any number of user machines 302A, 302B coupled to multiple inter-operating networks.

One or more resources 320A, 320B, 320N are communicatively coupled to network 306, either directly as in the case of resource 320N, or indirectly through an access router 308 as in the case of resources 320A, 320B. Certain steps of FIG. 1A, FIG. 1B may be implemented either access router 308 that governs access to one or more resources, or in a resource itself such as resource 320N. Resources 320A, 320B, 320N may comprise any element of network infrastructure or any network end station that an administrator or other party desires to protect against potential denial-of-service attacks. In one embodiment, resources 320A, 320B, 320N are content servers.

An access router 308 or resource 320N that implements the approaches herein may do so using accumulated POW logic 310, which includes or has access to server load data 312 and one or more accumulated work counts 314. POW logic 310 comprises one or more software elements to implement the processes of FIG. 1A, FIG. 1B. Server load data 312 comprises information indicating real-time capacity or load factors for resources 320A, 320B, 320N, for use by POW logic 310 in determining whether to require users 302A, 302B to perform additional work as a condition for accessing the resources. Server load data 312 may be obtained from a system or program that is separate from POW logic 310. Accumulated work counts 314 comprise values indicating the work accumulated in packets or messages that have been communicated for each connection of a user machine 302A, 302B to a resource 320A, 320B, 320N, for use in computing an amount of work to credit to a user of a user machine.

2.4 Other Characteristics of Certain Embodiments

In the approaches herein, proof of work is accumulated across multiple requests so that established users of a resource are not penalized when proof-of-work is used to prevent a denial of service or spam attack. Rather than penalizing all users, accumulated proof-of-work gives priority, embodied in a requirement for less work or no work, to returning users based on the length of their "successful" interactions with the resource.

Accumulated proof-of-work increases the difficulty of DoS attacks, because bots seeking to attack a resource need to have a long-term history of using that resource. While this requirement might make the most popular websites likely targets, such an attack is impractical to the extent that popular websites tend to replicate their resources so as to better service particular locales, such as across a content-distribution network. If each node of the distributed resource uses a separate encryption or signing key, then finding a large number of bots for a successful attack on a particular resource is much more difficult for the attacker.

Further, dedicated bots cannot rapidly accumulate work while attacking a resource. Such rapid accumulation may be foiled if the resource limits how often R(u) is returned, such as once a day. Additional security may be provided if the resource does not credit work (i.e., increase R(u)) to users for work performed while the system is highly congested and increasing individual k_r values.

Embodiments of the invention do not require secure connections, and do not require that the requester use any key-based cryptography. However, embodiments are nonetheless resistant to theft of previous proofs of work and replay of old messages.

Values supporting the approaches herein may be embodied in common "cookies" used by protocols such as HTTP. Embodiments may be used in HTTP or TCP cookies for protecting a variety of resources, including content delivery network routers and servers, Voice-over-IP call managers, and other IP telephony products. Embodiments may also be useful to protect video-on-demand and Internet mail products.

The embodiment of FIG. 1A, FIG. 1B does not require a message integrity check or the equivalent. If a node interposed between the requester and the resource is able to capture the cookie, then the node could use the cookie to get priority for its request, but the node will not be able to make use of the cookie in the future. This is true because at the end of the request, the resource passes back a cookie containing {H(i,x)||R(u')}key (the identifier and accumulated work parameter encrypted with a secret key). For an imposter to make use of the accumulated work value R(u'), the imposter must return later with a cookie comprising the values {H(i,x)||R(u)}key and H(i−1,x). However, the imposter will not have H(i−1,x) because only the true requester has the secret x and the hash chain, H(1,x), H(2,x)=h(H(1,x)), H(3,x)=h(H(2,x)), etc.

3.0 IMPLEMENTATION MECHANISMS

Hardware Overview

Figure 4:
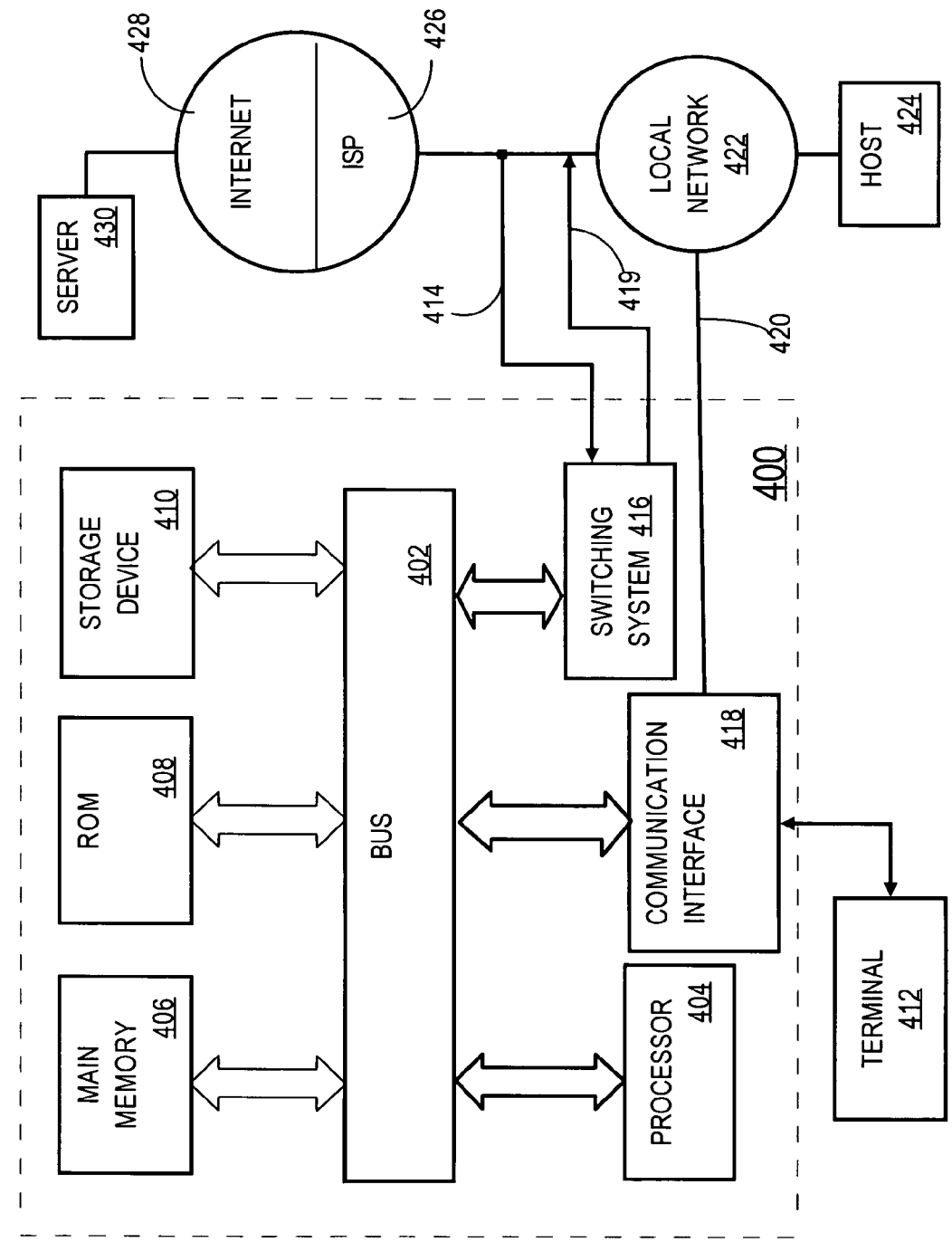
FIG. 4 is a block diagram that illustrates a computer system upon which an embodiment may be implemented.

FIG. 4 is a block diagram that illustrates a computer system 400 upon which an embodiment may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 418. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for implementing the approaches herein. According to one embodiment of the invention, an implementation of the approaches herein is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any storage medium that participates in providing instructions to processor 404 for execution. Such a medium may take many forms, including but not limited to, non-volatile storage media and volatile storage media. Non-volatile storage media includes, for example, optical or magnetic disks, such as storage device 410. Volatile storage media includes dynamic memory, such as main memory 406.

Common forms of computer-readable media include, for example, a floppy disk, a flexible disk, hard disk, magnetic tape, or any other magnetic medium, a compact disc read only memory (CD-ROM), any other optical medium, punch cards, paper tape, any other physical medium with patterns of holes, a random-access memory (RAM), a programmable read-only memory (PROM), and erasable programmable read-only memory (EPROM), a flash EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for the techniques described herein.

Processor 404 may execute the received code as it is received, and/or stored in storage device 410, or other non-volatile storage for later execution. In this manner, computer system 400 may obtain application code.

4.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of preventing an attack on a network, the method comprising the computer-implemented steps of:
    receiving a request to access a resource from a user, wherein the request includes an accumulated work value;
    wherein the accumulated work value represents a total amount of work previously performed by the user and accumulated across multiple prior requests by the user;
    receiving a prior keyless user identity value $H(i+1,x)$ in the request comprising a one-time password, wherein $H(i+1,x)$ is computed by the user as a hash chain from a non-shared user secret (x), wherein $H(n,x)=h(H(n-1,x))$, wherein $n>0$ and $H(0,x)=x$, wherein function h is a one-way function that is difficult to invert;
    receiving a current user identity value $H(i,x)$;
    verifying that the keyless user identity value properly identifies the user only upon determining that $h(H(i,x))==H(i+,x)$;
    wherein h comprises a SHA-1 hash algorithm;
    wherein n is between $10^4$ and $10^6$;
    determining whether the accumulated work value exceeds a required work threshold value, and if not, requiring the user to perform a quantity of work as a condition for accessing the resource;
    providing the user with access to the resource;
    determining an amount of accumulated work output value to provide to the user based on a volume of data communicated between the resource and the user; and
    wherein the accumulated work output value represents a second amount of work performed by the user;
    providing the accumulated work output value to the user.

2. A method as recited in claim 1, wherein the request includes a prior user identity value and a current user identity value, and further comprising the steps of determining whether a mathematical relationship of the current user identity value and the prior user identity value indicates that the user has possession of a resource secret.

3. A method as recited in claim 1, further comprising the step of determining the required work threshold value based on a then-current capacity of the resource.

4. A method as recited in claim 1, further comprising the steps of:
    determining the required work threshold value based on a then-current capacity of the resource;
    requiring a first user who has a first accumulated work value that is greater than the required work threshold value to perform a first amount of work as a condition for accessing the resource; and
    requiring a second user who has a second accumulated work value that is less than or equal to the required work threshold value to perform a second amount of work as a condition for accessing the resource, wherein the second amount of work is greater than the first amount of work.

5. A method as recited in claim 1, wherein the step of determining the amount of accumulated work output value is performed for a specified user only during a specified time period in which accumulating work is allowed for that specified user.

6. A method as recited in claim 1, wherein the step of determining the amount of accumulated work output value is performed for a specified user only if the current user identity value received from the user is not found in a list of user identity values that were previously received in a specified time period.

7. A method as recited in claim 1, further comprising the step of digitally signing and providing a timestamp to the user with the accumulated work output value, and wherein the step of determining the amount of accumulated work output value is performed for a specified user only upon:
    receiving the timestamp is received in a subsequent request;
    verifying the timestamp value; and
    determining that the timestamp value is within an allowed range.

8. A method as recited in claim 1, further comprising the step of receiving the accumulated work value, a prior user identity value and a current user identity value in a cookie provided by the user to the resource.

9. A method as recited in claim 1, wherein determining the amount of accumulated work output value to provide to the user based on the volume of data communicated between the resource and the user comprises determining the amount of accumulated work ouput value as $2^k*p$, where k is a number of bits of work previously performed by the user and p is a number of messages or packets communicated between the user and the resource.

10. A method as recited in claim 1, further comprising the step of providing the accumulated work output value in a cookie sent from the resource to the user.

11. A method as recited in claim 1, further comprising the step of selectively increasing the required work threshold value for a particular user in response to congestion conditions of the resource.

12. A method as recited in claim 1, wherein requiring the user to perform the quantity of work as a condition for accessing the resource comprises requiring the user to hash a message until a specified number of bits are zero.

13. A method of preventing an attack on a network, the method comprising computer-implemented steps of:
    receiving a request to access a resource from a user, wherein the request includes an accumulated work value that represents work that the resource has previously required the user to perform in order to obtain previous access to the resource;

receiving a prior keyless user identity value $H(i+1,x)$ in the request comprising a one-time password, wherein $H(i+1,x)$ is computed by the user as a hash chain from a non-shared user secret (x), wherein $H(n,x)=h(H(n-1,x))$, wherein $n>0$ and $H(0,x)=x$, wherein function h is a one-way function that is difficult to invert;

receiving a current user identity value $H(i,x)$;

verifying that the keyless user identity value properly identifies the user only upon determining that $h(H(i,x))==H(i+1,x)$;

wherein h comprises a SHA-1 hash algorithm;

wherein n is between $10^4$ and $10^6$;

determining whether the accumulated work value exceeds a required work threshold value; and providing the user with access to the resource only when the accumulated work value exceeds the required work threshold value.

14. An apparatus, comprising
one or more processors;

means for receiving a request to access a resource from a user, wherein the request includes an accumulated work value;

wherein the accumulated work value represents a total amount of work previously performed by the user and accumulated across multiple prior requests by the user;

means for receiving a prior keyless user identity value $H(i+1,x)$ in the request comprising a one-time password, wherein $H(i+1,x)$ is computed by the user as a hash chain from a non-shared user secret (x), wherein $H(n,x)=h(H(n-1,x))$, wherein $n>0$ and $H(0,x)=x$, wherein function h is a one-way function that is difficult to invert;

means for receiving a current user identity value $H(i,x)$;

means for verifying that the keyless user identity value properly identifies the user only upon determining that $h(H(i,x))==H(i+1,x)$;

wherein h comprises a SHA-1 hash algorithm;

wherein n is between $10^4$ and $10^6$;

means for determining whether the accumulated work value exceeds a required work threshold value, and if not, requiring the user to perform a quantity of work as a condition for accessing the resource;

means for providing the user with access to the resource;

means for determining an amount of accumulated work output value to provide to the user based on a volume of data communicated between the resource and the user; and wherein the accumulated work output value represents a second amount of work performed by the user;

means for providing the accumulated work output value to the user.

15. The apparatus of claim 14, wherein the request includes a prior user identity value and a current user identity value, and further comprising means for determining whether a mathematical relationship of the current user identity value and the prior user identity value indicates that the user has possession of a resource secret.

16. The apparatus of claim 14, further comprising:
means for determining the required work threshold value based on a then-current capacity of the resource;

means for requiring a first user who has a first accumulated work value that is greater than the required work threshold value to perform a first amount of work as a condition for accessing the resource; and means for requiring a second user who has a second accumulated work value that is less than or equal to the required work threshold value to perform a second amount of work as a condition for accessing the resource, wherein the second amount of work is greater than the first amount of work.

17. The apparatus of claim 14, wherein means for determining the amount of accumulated work output value is operable for a specified user only if the current user identity value received from the user is not found in a list of user identity values that were previously received in a specified time period.

18. The apparatus of claim 14, further comprising means for digitally signing and providing a timestamp to the user with the accumulated work output value, and wherein the means for determining the amount of accumulated work output value is operable for a specified user only upon:
receiving the timestamp is received in a subsequent request;
verifying the timestamp value; and
determining that the timestamp value is within an allowed range.

19. An apparatus, comprising:
a processor;
a computer-readable volatile or non-volatile medium storing one or more stored sequences of instructions that are accessible to the processor, wherein execution of the one or more stored sequences of instructions by the processor causes the processor to perform:

receiving a request to access a resource from a user, wherein the request includes an accumulated work value;

wherein the accumulated work value represents a total amount of work previously performed by the user and accumulated across multiple prior requests by the user;

receiving a prior keyless user identity value $H(i+1,x)$ in the request comprising a one-time password, wherein $H(i+1,x)$ is computed by the user as a hash chain from a non-shared user secret (x), wherein $H(n,x)=h(H(n-1,x))$, wherein $n>0$ and $H(0,x)=x$, wherein function h is a one-way function that is difficult to invert;

receiving a current user identity value $H(i,x)$;

verifying that the keyless user identity value properly identifies the user only upon determining that $h(H(i,x))==H(i+1,x)$;

wherein h comprises a SHA-1 hash algorithm;

wherein n is between $10^4$ and $10^6$;

determining whether the accumulated work value exceeds a required work threshold value, and if not, requiring the user to perform a quantity of work as a condition for accessing the resource;

providing the user with access to the resource;

determining an amount of accumulated work output value to provide to the user based on a volume of data communicated between the resource and the user; and wherein the accumulated work output value represents a second amount of work performed by the user;

providing the accumulated work output value to the user.

20. The apparatus of claim 19, wherein the request includes a prior user identity value and a current user identity value, and further comprising instructions which when executed by the processor cause determining whether a mathematical relationship of the current user identity value and the prior user identity value indicates that the user has possession of a resource secret.

21. The apparatus of claim 19, further comprising instructions which when executed by the processor cause:
determining the required work threshold value based on a then-current capacity of the resource;

requiring a first user who has a first accumulated work value that is greater than the required work threshold value to perform a first amount of work as a condition for accessing the resource; and requiring a second user who has a second accumulated work value that is less than or equal to the required work threshold value to perform a second amount of work as a condition for accessing the resource, wherein the second amount of work is greater than the first amount of work.

22. The apparatus of claim 19, wherein the instructions for determining the amount of accumulated work output value are performed for a specified user only if the current user identity value received from the user is not found in a list of user identity values that were previously received in a specified time period.

23. The apparatus of claim 19, further comprising instructions which when executed by the processor cause digitally signing and providing a timestamp to the user with the accumulated work output value, and wherein instructions for determining the amount of accumulated work output value is performed for a specified user only upon:
   receiving the timestamp is received in a subsequent request;
   verifying the timestamp value; and
   determining that the timestamp value is within an allowed range.

24. A computer-readable volatile or non-volatile medium storing one or more sequences of instructions, wherein execution of the one or more sequences of instructions by one or more processors causes the one or more processors to perform:
   receiving a request to access a resource from a user, wherein the request includes an accumulated work value;
   wherein the accumulated work value represents a total amount of work previously performed by the user and accumulated across multiple prior requests by the user;
   receiving a prior keyless user identity value $H(i+1,x)$ in the request comprising a one-time password, wherein $H(i+1,x)$ is computed by the user as a hash chain from a non-shared user secret (x), wherein $H(n,x)=h(H(n-1,x))$, wherein $n>0$ and $H(0,x)=x$, wherein function h is a one-way function that is difficult to invert;
   receiving a current user identity value $H(i,x)$;
   verifying that the keyless user identity value properly identifies the user only upon determining that $h(H(i,x))==H(i+1,x)$;
   wherein h comprises a SHA-1 hash algorithm;
   wherein n is between $10^4$ and $10^6$;
   determining whether the accumulated work value exceeds a required work threshold value, and if not, requiring the user to perform a quantity of work as a condition for accessing the resource;
   providing the user with access to the resource;
   determining an amount of accumulated work output value to provide to the user based on a volume of data communicated between the resource and the user; and
   wherein the accumulated work output value represents a second amount of work performed by the user;
   providing the accumulated work output value to the user.

25. The computer-readable storage medium of claim 24, wherein the request includes a prior user identity value and a current user identity value, and further comprising instructions which when executed by the one or more processors cause determining whether a mathematical relationship of the current user identity value and the prior user identity value indicates that the user has possession of a resource secret.

26. The computer-readable storage medium of claim 24, further comprising instructions which when executed by the one or more processors cause:
   determining the required work threshold value based on a then-current capacity of the resource;
   requiring a first user who has a first accumulated work value that is greater than the required work threshold value to perform a first amount of work as a condition for accessing the resource; and
   requiring a second user who has a second accumulated work value that is less than or equal to the required work threshold value to perform a second amount of work as a condition for accessing the resource, wherein the second amount of work is greater than the first amount of work.

27. The computer-readable storage medium of claim 24, wherein the instructions for determining the amount of accumulated work output value are performed for a specified user only if the current user identity value received from the user is not found in a list of user identity values that were previously received in a specified time period.

28. The computer-readable storage medium of claim 24, further comprising instructions which when executed by the one or more processors cause digitally signing and providing a timestamp to the user with the accumulated work output value, and wherein the instructions for determining the amount of accumulated work output value are performed for a specified user only upon:
   receiving the timestamp is received in a subsequent request;
   verifying the timestamp value; and
   determining that the timestamp value is within an allowed range.

* * * * *

UNITED STATES PATENT AND TRADEMARK OFFICE
CERTIFICATE OF CORRECTION

PATENT NO. : 7,600,255 B1  Page 1 of 1
APPLICATION NO. : 10/824729
DATED : October 6, 2009
INVENTOR(S) : Mark Baugher It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1059 days.

Signed and Sealed this

Fourteenth Day of December, 2010

David J. Kappos
*Director of the United States Patent and Trademark Office*